Nov. 22, 1932.　　　F. H. STOLP　　　1,888,479

ACCELERATING TRANSMISSION MECHANISM

Filed July 18, 1931　　　4 Sheets-Sheet 1

INVENTOR
Frank H. Stolp
BY Russell B Griffith
his ATTORNEY

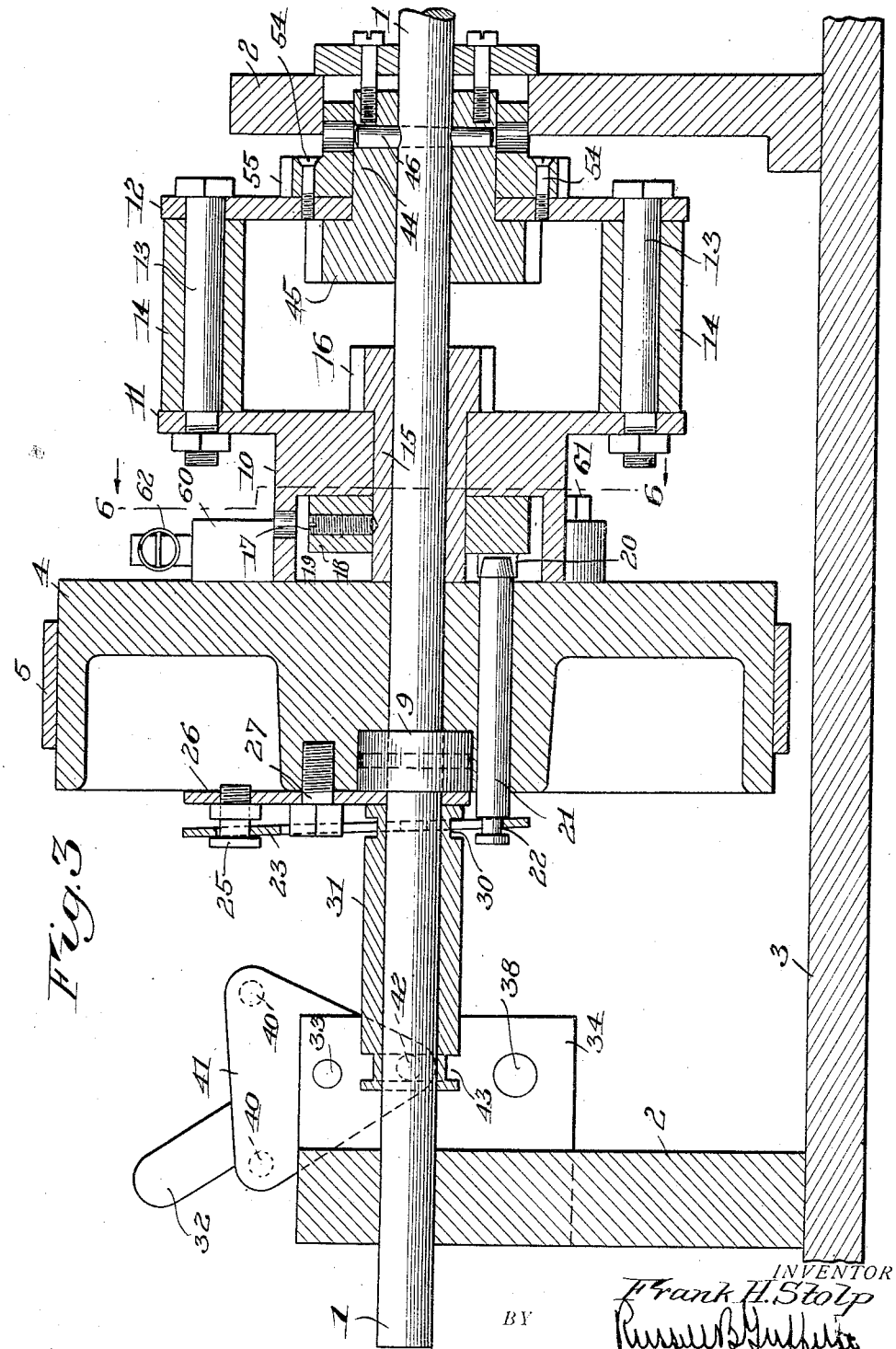

Nov. 22, 1932.　　　F. H. STOLP　　　1,888,479
ACCELERATING TRANSMISSION MECHANISM
Filed July 18, 1931　　4 Sheets-Sheet 4
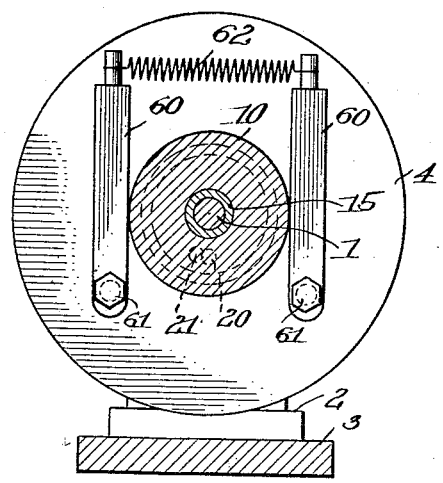
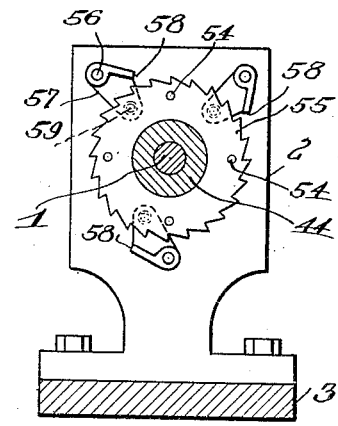
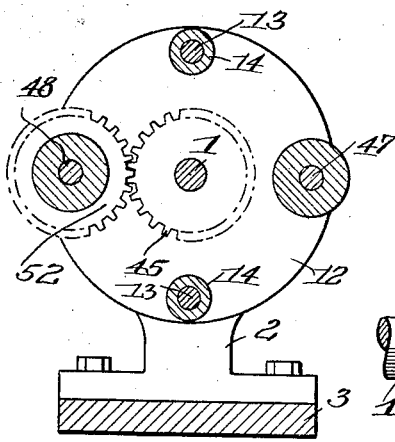
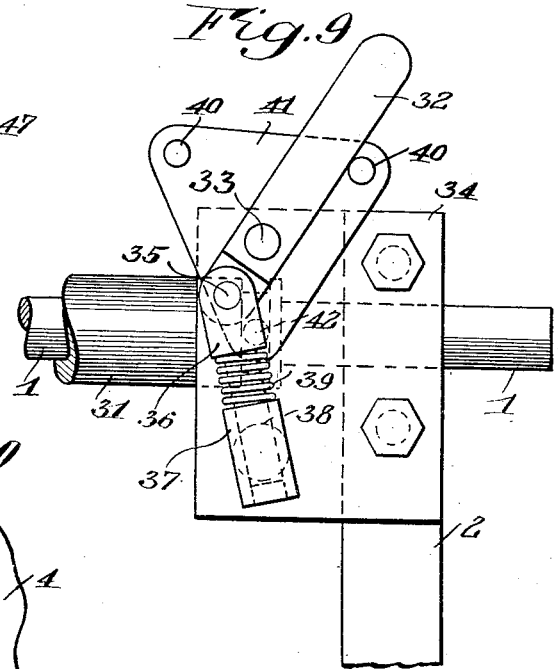
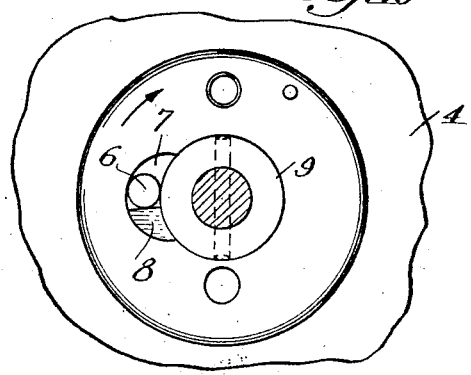
INVENTOR
Frank H. Stolp
BY
his ATTORNEY Patented Nov. 22, 1932

1,888,479

UNITED STATES PATENT OFFICE

FRANK H. STOLP, OF GENEVA, NEW YORK

ACCELERATING TRANSMISSION MECHANISM

Application filed July 18, 1931. Serial No. 551,704.

My present invention relates to mechanical movements and more particularly to variable speed power transmission mechanisms, and it has for its object to provide a simple, strong and efficient device of this character that will cause the driven element of a prime mover to slowly pick up speed under load through gearing enabling the prime mover to operate at initially increased mechanical advantage as it takes its load and which gearing gradually accelerates the speed of the driven element as such mechanical advantage decreases until a direct driving connection between the two is established at uniform speed.

To these and other ends, the invention resides in certain improvements and combinations of parts, all as will be hereinafter more fully described, the novel features being pointed out in the claims at the end of the specification.

In the drawings:

Fig. 3 is an enlarged longitudinal central sectional view with the parts in the same positions that they occupy in Figs. 1 and 2, but with certain of the gearing omitted to avoid confusion;

Fig. 6 is a transverse section, reduced, taken on the line 6—6 of Fig. 3;

Fig. 7 is a transverse section taken on the line 7—7 of Fig. 2, showing a certain ratchet mechanism in elevation and in normal position;

Fig. 8 is a transverse section taken substantially on the line 8—8 of Fig. 2;

Fig. 9 is an enlarged elevation of the operating or shipping device for the main clutch;

Fig. 10 is a fragmentary elevation, in section through the shaft, of the driving element showing a certain overrunning clutch mechanism.

Similar reference numerals throughout the several views indicate the same parts.

Figure 1:
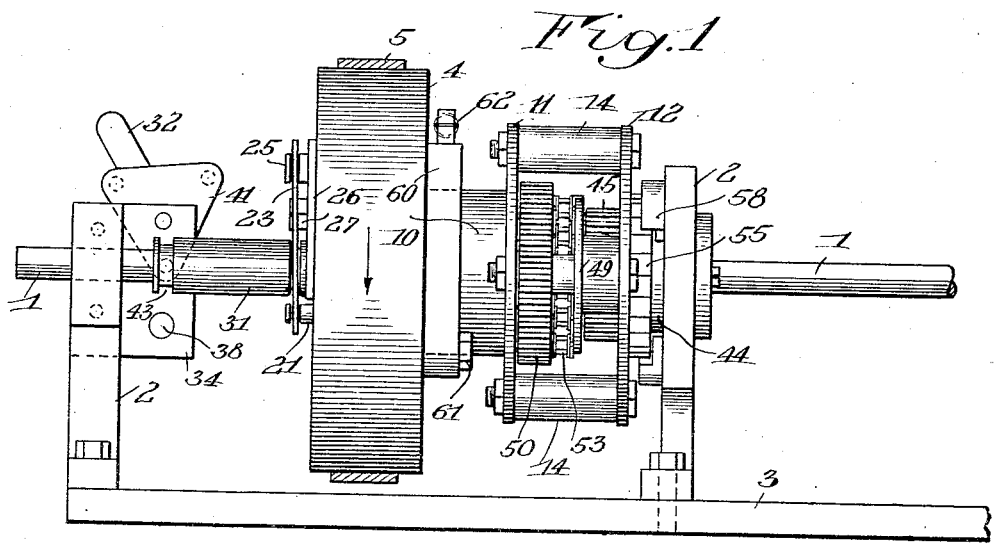
Fig. 1 is a side view of a transmission mechanism constructed in accordance with and illustrating one embodiment of my invention.

To first give a general idea of my improved transmission mechanism and its function, I utilize a single shaft, on one end of which is a driving element rotatable thereon in one direction only through an overrunning clutch. Also freely rotatable relatively to the shaft in the same direction is a gear carrier, upon which is mounted gearing that turns bodily therewith. Through a main clutch, the driving element locks for rotation with an otherwise loose pinion on the shaft which, through the gearing on the gear carrier and a gear fixed to the shaft, starts the latter slowly relatively to a uniform speed of the driving element, the gearing being of a nature that accelerates this speed until it completes a cycle and then locks all parts together for a direct drive or a speed of rotation the same as that of the driving element. When the main clutch is disengaged or thrown out, the continuous movement of the driving element or its initial movement, if stopped, resets the differential gearing for a succeeding cycle.

Referring more particularly to the drawings, 1 indicates a driven shaft rotatable in suitable bearings represented conventionally by blocks or standards 2 on a base 3. The driving element is, in the present instance, in the form of a pulley 4 turned in the direction of the arrows by a belt 5 from a suitable prime mover or source of power. Assuming that it turns continuously in the one direction, it is free on the shaft but, as shown in Figs. 3 and 10, it is provided with reference to the latter with an overrunning clutch with the object of preventing a reverse movement of the shaft relatively thereto for a purpose that will hereinafter appear. This overrunning clutch is of a familiar type embodying a roller 6 in an eccentric cavity 7 with weight 8 behind it instead of a spring, the roller resting on the periphery of a collar 9 pinned to the shaft. Only when the speed of the shaft tends to exceed that of the pulley does the roller jam in the cavity and lock the two together or the same relative movement is produced by a halting or backward movement of the shaft.

Figure 2:
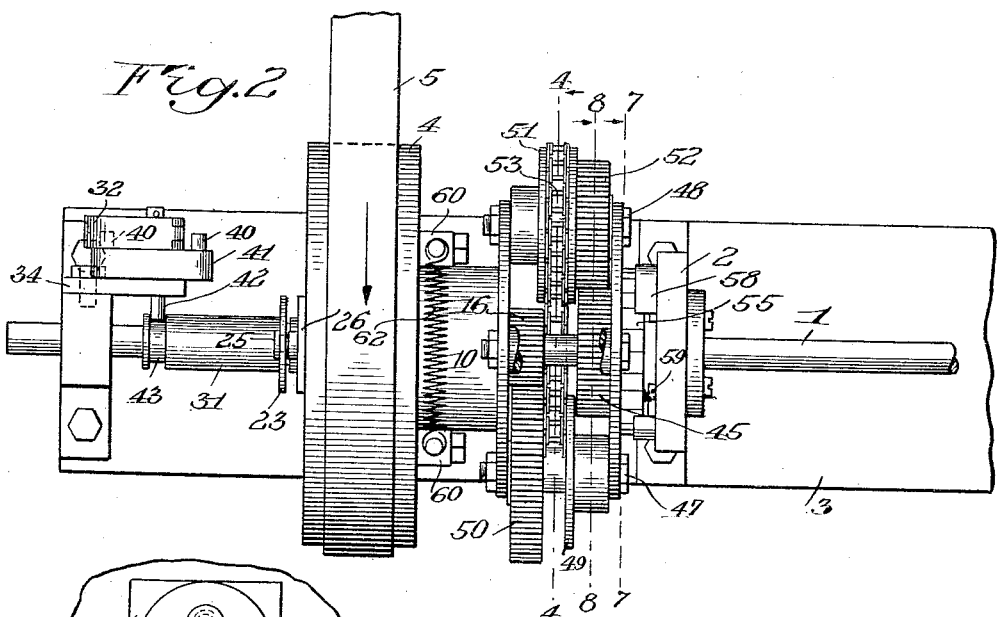
Fig. 2 is a top plan view thereof.
Figure 11:
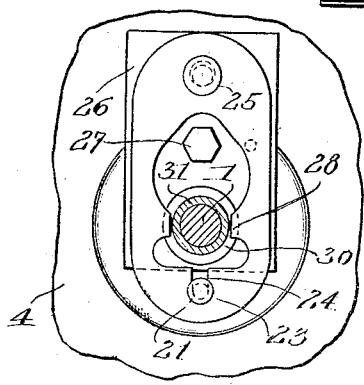
Fig. 11 is a fragmentary elevation, taken in transverse section through the shaft, of the driving element and the clutch shipping device.

Also turning freely on the shaft and having a hub portion 10 abutting the inner face of the pulley is a gear carrier constituted, in the present instance, by a pair of disks 11 and 12 bolted together at 13 and spaced in parallelism by sleeves 14 surrounding the bolts. The hub 10 and disk 11 of the carrier actually turn on the interposed hub portion 15 of a pinion 16 also free on the shaft and which we will call the driving or winding pinion. There is secured to this pinion hub 15 by a set screw 17 a disk or collar 18 within a cavity 19 in hub 10, which collar is provided with a laterally projecting clutch pin 20 forming part of the main clutch of the mechanism which, at the selection of the operator, interlocks the driving element or pulley 4 with the driving pinion 16. The cooperating clutch element is a longitudinally slidable pin 21 extending through the pulley to project into the path of pin 20 when pressed in that direction. A reduced portion 22 on the opposite end of pin 21 projecting from the other face of the pulley is engaged by an actuating yoke 23 (Figs. 3 and 11) slotted for the purpose at 24 and surrounding the driven shaft 1. This yoke articulates on a headed screw 25 locked to a plate 26 bolted to the pulley at 27 and nibs 28 thereon projecting into the central opening engage within the groove or reduced portion 30 in a longitudinally slidable shipping sleeve 31 on the shaft. Any suitable shipper may be used to shift this sleeve and operate the clutch alternately to engage and disengage positions. In the present instance and as shown more in detail in Fig. 9, an operating lever 32 pivoted at 33 to a bracket 34 has its short arm pivoted at 35 to the head of a plunger 36 slidable in a socket 37 oscillating on the bracket at 38. A coiled spring 39 interposed between the socket and the plunger head functions to throw the operating lever 32 forcibly in either of two opposite directions once the pivot 35 passes the dead center as will be understood. In so doing, the operating lever 32 strikes one of two pins or abutments 40 on an oscillating plate 41 also pivoted at 33 and causes it to rock in one direction or the other. A pin 42 on this plate, as shown in Fig. 2, projects into a groove 43 in the shipping collar 31 and the latter is made to slide correspondingly and throw the clutch as described.

Returning to the gear carrier 11—12, the disk 12 thereof also in reality runs freely on the hub 44 of a driven gear 45 pinned to the driven shaft 1 at 46. What I will now describe is the gearing on the gear carrier whereby driving pinion 16 imparts motion to driven gear 45 and hence driven shaft 1 on a differential ratio ascending as to speed and descending as to power.

Figure 4:
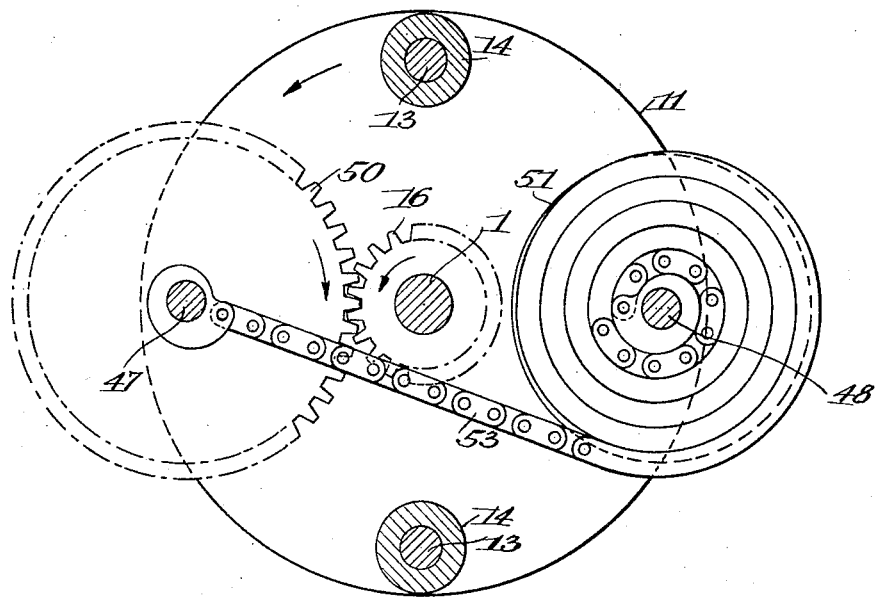
Fig. 4 is an enlarged transverse section taken substantially on the line 4—4 of Fig. 2, showing in detail and in elevation the winding mechanism of the accelerator in one extreme position.
Figure 5:
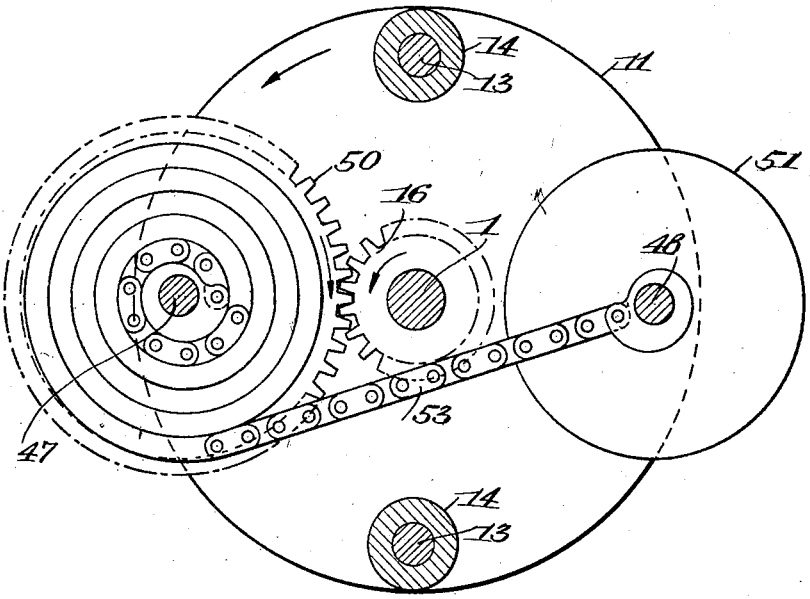
Fig. 5 is a similar view showing the same parts in the opposite extreme position.

The carrier 11—12 is provided with two fixed shafts 47 and 48 arranged diametrically opposite to each other. On shaft 47 is a take-up spool or drum 49 fixed to a gear 50 meshing with driving pinion 16. On shaft 48 and in the same transverse plane with drum 49 is a feed-off drum 51 fixed to a gear 52 meshing with driven gear 45. A flexible element, in the present form of a chain 53, has its ends respectively fastened to the two drums. Normally, it is wound to the limit upon feed-off drum 51, as shown in Fig. 2, in which figure the parts are in the position that they occupy just as the main clutch is thrown in. The operation from there on is as follows:

There being a load or yielding resistance on driven shaft 1, as soon as clutch pin 21 picks up pin 20 with the uniform rotation of driving pulley 4, the latter locks with driving pinion 16. This in turn drives gear 50 and the chain 51 commences to wind up on the minimum circumference of winding drum 49, as shown in Fig. 4, (which corresponds to Fig. 2) and to unwind from drum 51, rotating gear 52 and rotating driven gear 45 fixed to the driven shaft, so that the latter turns slowly in the same direction with the driving pulley and to the mechanical advantage of the latter. As the winding continues, it is obvious that the speed of the shaft increases as the superposed convolutions of the chain build up on the winding drum 49 and increase the diameter while they correspondingly work down to a minimum diameter on the feed-off drum 51. When the chain is completely unwound, as shown in Fig. 5, the driving pinion 16 still has a tendency to turn gear 50 but can no longer do so, so that both gears 50 and 52 become locked in mesh with their respective driving and driven elements. Being carried by the rotatable carrier 11—12, the result is that driving pinion 16 directly drives the whole carrier revolving the intermediate gears, which similarly turn the shaft 1 through driven gear 45 without themselves rotating relatively to it and at maximum speed. The reactive force that would tend to cause the carrier to rotate backwards through the resistance set up by the gearing during winding of the chain under some conditions of load is taken care of by a ratchet mechanism shown in detail in Fig. 6. Fixed to disk 12 between it and the bearing standard 2 as by screws 54 is a ratchet wheel 55, while pivoted on the standard at 56 is a plurality of pawls 57 having engaging noses 58. Springs 59 on the pawls frictionally engage a lateral face of the ratchet, so that on retrograde movement of the latter, the noses are thrown into operative position.

As so far described, throwing out the main clutch would simply disconnect the driving pulley 4 from driving pinion 16 and allow it to continue to run idly, leaving all of the rest of the mechanism disconnected and at rest. But it would also leave the intermediate gearing in the wound and locked position of Fig. 5. Obviously, the chain 53 must be rewound upon drum 49. In the present instance, I provide the following means for accomplishing this:

A constantly operating light friction clutch, the effect of which is easily overcome by the other driving mechanism operates to directly couple the driving pulley 4 with the gear carrier 11—12. As shown in Fig. 6, it consists of a pair of arms 60 pivoted to the adjacent lateral face of the pulley 4 at 61. Their opposite free ends are connected by a coiled spring 62 tending to draw them together and as they are on opposite sides of the drum 10 of the gear carrier, they ride frictionally on its surface and operatively connect the driving pulley and the carrier when the latter offers no substantial resistance. Thus, when the clutch is thrown out, that is, the main clutch, with the results above described, this friction clutch functions. It being assumed that there is still a load on the driven shaft (otherwise all of the other parts would rotate together through friction), the result is that the carrier 11—12 alone is driven. As it so rotates, revolving the intermediate gears 50 and 52 with it, the latter gear encircles driven gear 45, which is now fixed, and the latter causes it to rotate on its own axis and to rotate the connected feed-off drum 51 upon which the chain 53 is thereby rewound. In the meantime, the opposite drum and gear 49—50 is free to reverse and to reverse driving pinion 16 as the latter is perfectly free. But when the rewinding is complete, the gearing locks again as it did during its operative cycle and the friction clutch being insufficient to turn the carrier bodily any further by assuming the load, it slips and thereafter slides idly on the carrier drum.

In most instances of use, the driving pulley 4 will be turning continuously as described but, if by circumstance or design it should stop coincidently with the disengagement of the main clutch leaving the intermediate gearing unwound, the first thing that it would do upon the renewal of its motion would be to accomplish the rewinding.

I claim as my invention:

1. In a power transmission mechanism, the combination with a driving element and a driven element, of gearing between the two acting initially to the mechanical advantage of the driving element and having a limited cycle of movement during which it tends to build up the speed of the driven element during a progressive decrease in the mechanical advantage of the driving element, said gearing embodying means for locking the driving and driven elements together for direct drive at the conclusion of the cycle, and an over-running clutch between the driving and driven elements operating to prevent reverse movement of the driven element.

2. In a power transmission mechanism, the combination with a driving element and a driven element, of gearing between the two acting initially to the mechanical advantage of the driving element and having a limited cycle of movement during which it tends to build up the speed of the driven element during a progressive decrease in the mechanical advantage of the driving element, said gearing embodying means for locking the driving and driven elements together for direct drive at the conclusion of the cycle, a releasable clutch operatively connecting the driving element with the gearing, and an over-running clutch between the driving and driven elements operating to prevent reverse movement of the driven element.

3. In a power transmission mechanism, the combination with a driven shaft, and a driving element rotatable thereon, of a driving pinion free on the shaft, a driven gear fixed to the shaft, a gear carrier rotatable on the shaft relatively to the driving element and provided with gearing operatively connecting the driving and driven elements through the driving pinion and the driven gear to the mechanical advantage of the driving element, said gearing having a limited cycle of movement during which it tends to build up the speed of the driven element during a progressive decrease in the mechanical advantage of the driving element thereon and the gear carrier being itself adapted to be rotated by the driving pinion through the gearing at the end of the cycle of the latter and to lock with the driven gear to communicate a direct drive to the driven element from the driving element, and a releasable clutch operatively connecting the driving element with the driving pinion.

4. In a power transmssion mechanism, the combination with a driving element and a driven element, of gearing between the two embodying a take-up drum geared to the driving element, a feed-off drum geared to the driven element, a flexible element having its ends connected to the respective drums and adapted to be alternately wound thereon and automatically acting means cooperating with the driving element for rewinding the flexible element on the feed-off drum.

5. In a power transmission mechanism, the combination with a driving element and a driven element, of gearing between the two embodying a take-up drum geared to the driving element, a feed-off drum geared to the driven element and a flexible element having its ends connected to the respective drums and adapted to be alternately wound thereon, a rotary carrier for the gearing adapted through its rotation to transmit motion from the driving element to the driven element when the flexible element is wound on the take-up drum and continuously acting means between the driving element and the carrier for rewinding the flexible element on the feed-off drum.

6. In a power transmission mechanism, the combination with a driving element and a driven element, of gearing between the two embodying a take-up drum geared to the driving element, a feed-off drum geared to the driven element and a flexible element having its ends connected to the respective drums and adapted to be alternately wound thereon, a rotary carrier for the gearing adapted through its rotation to transmit motion from the driving element to the driven element when the flexible element is wound on the take-up drum, means for preventing reverse movement of the carrier, a clutch controlling the connection between the driving element and the gearing, and a slip clutch directly connecting the driving element and the gear carrier.

7. In a power transmission mechanism, the combination with a driven shaft and a driving element rotatable thereon, of a driving pinion free on the shaft, a driven gear fixed to the shaft, a gear carrier rotatable on the shaft relatively to the driving element and provided with gearing embodying a take-up drum geared to the driving pinion, a feed-off drum geared to the driven gear and a flexible element having its ends connected to the respective drums and adapted to be alternately wound thereon, a clutch connecting the driving element and the driving pinion, and a slip clutch directly connecting the driving element and the gear carrier for rewinding the flexible element.

8. In a power transmission mechanism, the combination with a driven shaft and a driving element rotatable thereon, of a driving pinion free on the shaft, a driven gear fixed to the shaft, a gear carrier rotatable on the shaft relatively to the driving element and provided with gearing embodying a take-up drum geared to the driving pinion, a feed-off drum geared to the driven gear and a flexible element having its ends connected to the respective drums and adapted to be alternately wound thereon, a clutch connecting the driving element and the driving pinion, a slip clutch directly connecting the driving element and the gear carrier for rewinding the flexible element, and means for preventing reverse movement of the gear carrier.

FRANK H. STOLP.